United States Patent Office 3,085,562
Patented Apr. 16, 1963

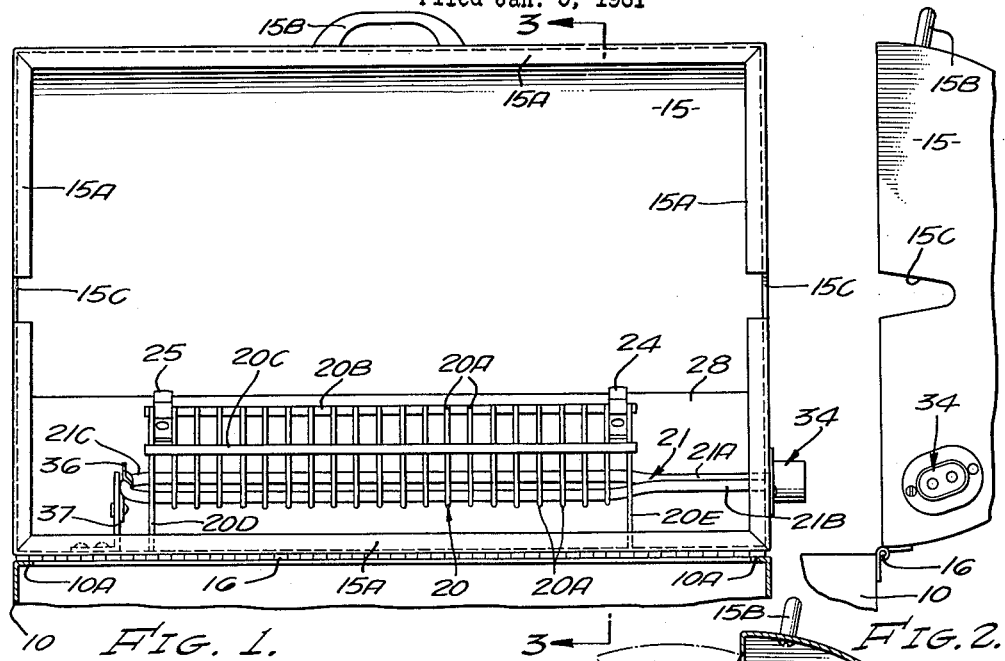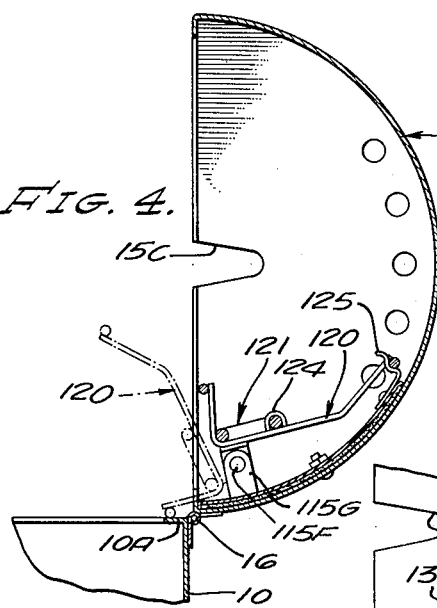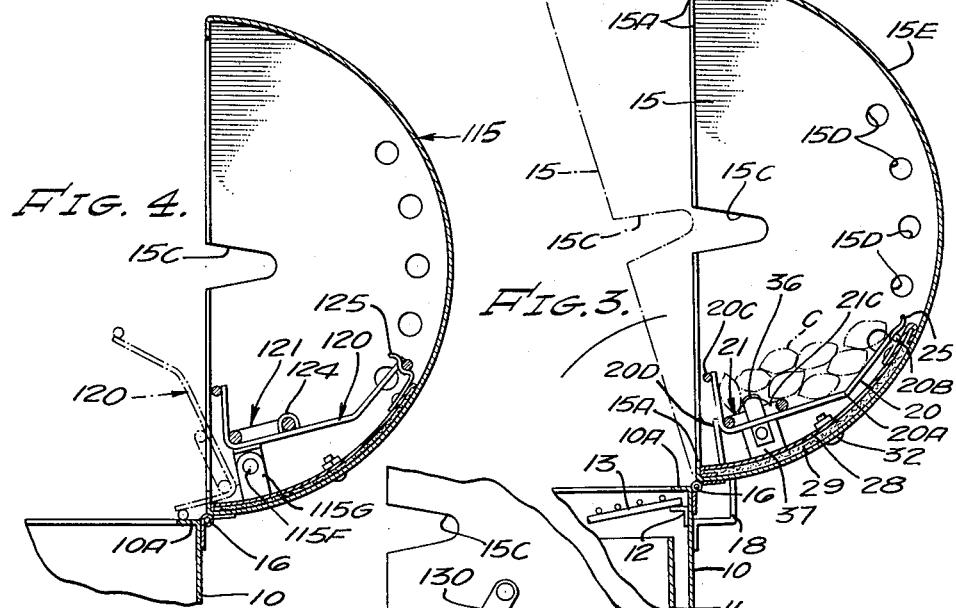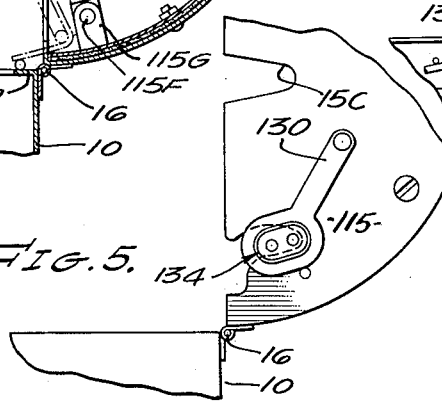

3,085,562
BARBECUE EQUIPMENT
Laverne O. Persinger, Burbank, and Merle L. Persinger, Glendale, Calif., assignors to Big Boy Manufacturing Company, a division of Seidelhuber Steel Rolling Mill Corporation, Burbank, Calif., a corporation of Washington
Filed Jan. 5, 1961, Ser. No. 80,762
5 Claims. (Cl. 126—25)

The present invention relates to barbecue equipment using fuel in the form of charcoal briquettes.

One of the problems involved in the use of charcoal-burning barbecue equipment is the preparation of a suitable heat-glowing charcoal bed. Many attempts have been made in the past to satisfactorily solve this problem and these attempts involved generally auxiliary heat sources such as (1) burnable fluids, i.e. so-called igniting fluids, which were used to wet or saturate the charcoal briquettes prior to setting the combination of briquettes and fluid afire; (2) a bed of paper and/or wood upon which the charcoal briquettes were placed to heat the briquettes to a temperature where they could sustain a cooking temperature; (3) electrical heating units which were either portable or built into the barbecue equipment.

The disadvantages resulting from the use of igniting fluids and wood and/or paper are obvious and these disadvantages arise largely from requirements of availability, storage, and handling of additional materials. While this problem has been more successfully solved using an auxiliary electrical heating unit, other problems arise in its use. Such other problems involved proper placement of the charcoal briquettes on the electrical heating element and exercising careful attention to subsequent withdrawal of the heating element from the ignited charcoal to prevent the heat developed by the charcoal from heating the electrical unit to a temperature at which the heating element is either burned out or has its service life shortened. Also, even when the necessary care was exercised, problems arose in proper storage or placement of such electrical unit such that persons, particularly including children, were not inadvertently burned by the unit and the unit would again be readily available for further use without being lost or misplaced.

These problems were such that oftentimes they were determinative of whether or not one would set up his barbecue equipment to enjoy its advantages.

In accordance with certain features of the present invention, these problems are solved using an electrical heating unit mounted uniquely with respect to a novel auxiliary charcoal briquette basket into which the charcoal is initially loaded and from which the subsequently electrically heated charcoal is dumped into the firebox or bowl of the otherwise conventionally-constructed barbecue equipment.

It is therefore a general object of the present invention to provide improved means and techniques for satisfactorily solving those problems inherent in prior practices and alluded to above.

Another object of the present invention is to provide an improved barbecue in which an electrical heating element is associated with a movable auxiliary charcoal basket or box in which the charcoal is initially heated and from which the heated charcoal may be dumped into the firebox or bowl.

Another object of the present invention is to provide an arrangement as set forth in the next preceding paragraph in which the auxiliary basket is mounted on a so-called smoker lid of the barbecue such that movement of the lid to open position renders the auxiliary charcoal basket readily available for convenient loading and closing of the lid results in automatic dumping of the charcoal from the basket into the firebox or bowl.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a view in front elevation of a portion of a barbecue embodying features of the present invention.

FIGURE 2 is a view in end elevation of the same.

FIGURE 3 is a view taken generally on the line 3—3 in FIGURE 1.

FIGURES 4 and 5 illustrate a modification of the invention, FIGURE 4 being a view corresponding to FIGURE 3 and FIGURE 5 being a view corresponding to FIGURE 2.

The barbecue shown in the drawings is conventional as to the following details. It includes an open-ended casing 10 of sheet metal in which is disposed a conventional rectangularly-shaped firebox or pan 11 and has suitable conventional brackets or bracketed portions 12 extending inwardly near its upper open end for supporting a removable rectangularly-shaped grill 13 on which comestibles are placed for cooking by glowing charcoals in firebox 11. The firebox 11 may be adjustably supported at different heights within casing 10 and with respect to grill 13, using a conventional adjustable lift mechanism (not shown) for that purpose.

A semicylindrical lid or so-called smoker hood 15 of sheet metal is hinged by means of piano-type hinge 16 along one upper edge of casing 10 so that the open end of casing 10 may be closed off by lid 15 in its lowered position wherein the inturned marginal edge portions 15A of lid 15 rest on inturned marginal edge portions 10A of casing 10.

The lid 15 is conveniently moved between its closed and open positions shown in FIGURE 3 by its handle 15B attached thereto, the lid 15 being retained in such open position as a result of gravity forces acting thereon with stop means exemplified for convenience as an L-shaped bracket 18 on casing 10 serving as a stop member for limiting clockwise pivoting movement of lid 15.

Also, the lid 15 may include an open-ended slot 15C in each of its ends, aligned to allow passage and clearance of a conventional spit (not shown) rotatable by conventional means (not shown); and apertures 15D which may be adjustable in size are provided in one or both ends of the lid 15 to control or adjust the amount of heat and/or smoke which may leave the cooking space under lid 15 in its closed position.

In accordance with important features of the present invention, an auxiliary charcoal briquette basket 20, having associated therewith an electrical heating element 21, is movably mounted with respect to the firebox 11 such that the charcoal may be initially heated in basket 20 by element 21 and then subsequently dumped into the firebox 11.

For these purposes, as illustrated in FIGURES 1–3, the basket 20 comprises an open framework of suitably bent and welded wires and rods, there being a series of bent parallel spaced wires 20A having their ends welded to cross rods 20B and 20C.

The basket 20 is preferably releasably maintained within and on lid 15, using the following construction. A pair of spring clips 24 and 25 engage the rod 20B near its corresponding opposite ends and wires 20D and 20E are welded to the outermost ones of wires 20A to provide feet for the basket 20 that engage a portion of lid 15 which, as illustrated in FIGURE 3, preferably comprises a complementary curved heat-reflecting sheet 28 spaced from the complementary arcuately-curved wall portion 15E of lid 15 by a sheet of heat-insulating material 29. The clips 24 and 25 are secured to this heat-reflecting metal sheet 28 which in turn is secured to the arcuate portion 15E of lid 15 by fastening means 32 passing through sheet 28, insulation 29 and the arcuate curved wall portion 15E.

The heating element 21 of generally hairpin shape is maintained in basket 20 using the following construction. The heating element 21 is a so-called Calrod unit having a plug-type terminal provided at each of its open ends 21A and 21B which are releasably inserted into the electrical socket 34 on one end wall of lid 15, the U-shaped portion 21C of unit 21 being retained in plugged-in condition by a spring clip 36 on bracket 37 secured to lid 15.

It will thus be seen from this construction in FIGURES 1–3 that the basket and heating unit assembly 20, 21 is mounted on the lid 15 for movement therewith and that in the open position of the lid 15 in FIGURE 3 the basket is automatically positioned to receive charcoal C which is loaded on top of the heating element 21 for heating thereby. After sufficient heating of the charcoal C by element 21, the lid 15 is moved to its closed position with the result that the heated charcoal C is dumped into the firebox 11. After again opening the lid, the removable grill 13 may then be placed on its supporting brackets 13 and comestibles to be cooked then placed on the grill 13 for cooking by the conditioned charcoal now in firebox 11. During this cooking procedure the lid 15 is closed to obtain further advantages of the same as a smoker hood.

The modification shown in FIGURES 4 and 5 allows dumping of the heated charcoal without movement of the lid and may be used in those particular barbecue constructions where an element positioned like lid 15 in FIGURE 4 is stationarily mounted and an auxiliary closure member (not shown) is pivoted on the barbecue to close the upper end of casing 10.

As illustrated in FIGURE 4, the basket 120 is pivoted about pivot pin 115F on bracket means 115G on member 115 which may be a stationary member as described above or may be a hinged lid as shown in FIGURE 4. The heating element 121 is now fastened to the basket 120 as, for example, by a metal strap 124 and the basket and heating unit assembly 120, 121 may be pivoted about pin 115F by moving the handle or lever 130 which is secured to the heating unit socket 134, it being noted that the member 115 is now provided with an open-ended clearance slot to allow the assembly 120, 121 to move independently of member 115 to permit dumping of the heated charcoal in basket 120 into the firebox 11 without movement of member 115. During this movement of lever 130, the basket is released from its normal engagement with the spring-retaining clip 125. Upon return movement of the basket 120, it is again engaged by clip 125 so that movement of member 115, when in the form of a hinged lid as shown in FIGURE 4, results in the same operation as described above in connection with FIGURES 1–3.

While the heating units 21 in FIGURES 1–3 and 121 in FIGURES 4 and 5 are essentially for purposes of heat-conditioning the charcoal, the manner in which it is mounted provides other advantages, namely it may be used for the cooking of comestibles on grill 13 with or in the absence of charcoal in the firebox 11. For this purpose the comestibles may simply be placed on the grill 13, the lid 15 closed and power applied to the heating unit 21 which is now positioned over and above the comestibles with the heat being reflected by heat reflector 28 and with the heat being retained by the closed lid 15. Similarly, the heating unit 121 in FIGURE 4 may be positioned as indicated therein, and the upper end of casing 10 closed for cooking without charcoal.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. Barbecue equipment comprising a supporting structure, a firebox for charcoal on said structure, a charcoal container, an electrical heating element in said container, and means for pivotally mounting said container and element as a unit on said structure for movement about a horizontal axis, said container being selectively positioned by said mounting means in an upright position or in a partially inverted position above said firebox so as to dump charcoal from said container into said firebox.

2. Barbecue equipment comprising an open-ended supporting structure, a firebox disposed in said structure, a lid movably mounted on said structure to close said structure, and an electrical heating unit mounted on said lid above said firebox, and a charcoal container in said lid in heat relationship to said heating unit.

3. Barbecue equipment as set forth in claim 2 wherein said container is so arranged such that charcoal in said container is heated by said element, said container being positioned from an upright position to a substantially inverted position over said firebox upon movement of said lid to its closed position on said structure to dump charcoal from said container into said firebox.

4. Barbecue equipment comprising a casing, a firebox disposed in said casing, a lid for closing said casing pivotally mounted on a horizontal axis on said casing, said lid being a semi-cylinder, a charcoal container mounted on said lid and within the confines thereof, and an electrical heating unit in said container, said container being positioned in an upright position when said lid is open and in a substantially inverted position over said firebox upon movement of said lid to its closed position so as to dump charcoal from said container into said firebox.

5. In barbecue equipment, the combination comprising, a supporting structure, a firebox for charcoal mounted on said structure, an auxiliary charcoal container, means mounting said container on said structure for relative movement over said firebox and between said box and container, an electrical heating unit in said container in heat relationship to charcoal in said container, a lid pivotally mounted on a horizontal axis on said structure for confining heat produced by charcoal in said firebox, said lid comprising said mounting means, said container being mounted on and being moved by said lid from an upright position to a substantially inverted position over said firebox for dumping charcoal from said container into said firebox when said lid is moved to closed heat-confining position.

References Cited in the file of this patent

UNITED STATES PATENTS

| | | |
|---|---|---|
| 1,987,899 | Gelsdorf | Jan. 15, 1935 |
| 2,748,690 | Lipsich et al. | June 5, 1956 |
| 2,792,773 | Barker | May 21, 1957 |
| 2,938,988 | McCutcheon et al. | May 31, 1960 |
| 2,939,773 | Rymer | June 7, 1960 |
| 2,956,497 | Bernstein | Oct. 18, 1960 |
| 2,982,840 | McCutcheon | May 2, 1961 |

FOREIGN PATENTS

| | | |
|---|---|---|
| 607,965 | Canada | Nov. 1, 1960 |